(12) United States Patent
Purkait et al.

(10) Patent No.: US 10,397,479 B2
(45) Date of Patent: Aug. 27, 2019

(54) SYSTEM AND METHOD FOR MOTION COMPENSATION IN IMAGES

(71) Applicant: Kabushiki Kaisha Toshiba, Minato-ku (JP)

(72) Inventors: Pulak Purkait, Cambridge (GB); Christopher Zach, Cambridge (GB)

(73) Assignee: Kabushiki Kaisha Toshiba, Minato-ku (JP)

(*) Notice: Subject to any disclaimer, the term of this patent is extended or adjusted under 35 U.S.C. 154(b) by 0 days.

(21) Appl. No.: 15/895,320

(22) Filed: Feb. 13, 2018

(65) Prior Publication Data
US 2019/0068884 A1 Feb. 28, 2019

(30) Foreign Application Priority Data
Aug. 29, 2017 (GB) .................................. 1713822.3

(51) Int. Cl.
H04N 5/232 (2006.01)
G06T 7/246 (2017.01)
G05D 1/02 (2006.01)
G05D 1/00 (2006.01)

(52) U.S. Cl.
CPC ....... *H04N 5/23254* (2013.01); *G05D 1/0088* (2013.01); *G05D 1/0251* (2013.01); *G06T 7/251* (2017.01); *H04N 5/23258* (2013.01); *H04N 5/23267* (2013.01); *G05D 2201/0213* (2013.01)

(58) Field of Classification Search
CPC .................................. H04N 5/23254
USPC .................................... 348/208.12
See application file for complete search history.

(56) References Cited

U.S. PATENT DOCUMENTS

2015/0086080 A1* 3/2015 Stein .................. G06K 9/00798
382/104
2016/0037032 A1 2/2016 Iwama

FOREIGN PATENT DOCUMENTS

EP 2 091 020 A1 8/2009
JP 07302325 A 11/1995

OTHER PUBLICATIONS

Intellectual Property Office Combined Search and Examination Report dated Feb. 1, 2018 in GB1713822.3, filed on Aug. 29, 2017.
Sung Hee Park et al. "Gyro-based multi-image deconvolution for removing handshake blur," IEEE Conference on Computer Vision and Pattern Recognition, 2014, pp. 8.

(Continued)

Primary Examiner — Joel W Fosselman
(74) Attorney, Agent, or Firm — Oblon, McClelland, Maier & Neustadt, L.L.P.

(57) ABSTRACT

A method of compensating for camera motion during capture of the image in a rolling shutter camera, the method comprising:
  receiving an image of a scene captured by a camera with a rolling shutter;
  extracting line segments in said image;
  estimating the movement of the camera during the capturing of the image from the received image; and
  producing an image compensated for the movement during capture of the image,
  wherein the scene is approximated by a horizontal plane and two vertical planes that intersect at a line at infinity and estimating the movement of the camera during the capture of the image comprises assuming that the extracted line segments are vertical and lie on the vertical planes.

20 Claims, 7 Drawing Sheets

(56) References Cited

OTHER PUBLICATIONS

Matthias Grundmann et al. "Calibration-free rolling shutter removal," IEEE Computer Society, 2012, pp. 8.
Shuochen Su et al. "Rolling shutter motion deblurring," IEEE Computer Society, Jun. 2015, pp. 9.
Vijay Rengarajan et al. "From bows to arrows: Rolling shutter rectification of urban scenes," IEEE Conference on Computer Vision and Pattern Recognition, 2016, pp. 9.
Pulak Purkait et al. "Rolling Shutter Correction in Manhattan World," IEEE International Conference on Computer Vision, 2017, pp. 9.

* cited by examiner (a) 1-LA, ang. velo.

(b) 3-LA, trans. velo.

(c) 4-LA, trans. velo. 20km/h (d) 4-LA, trans. velo. 60km/h (e) 4-LA, trans. velo. 100km/h (f) 4-LA, trans. velo. 140km/h

SYSTEM AND METHOD FOR MOTION COMPENSATION IN IMAGES

FIELD

Embodiments described herein generally relate to the field of computer vision.

BACKGROUND

Automotive driver-less vehicles have sparked a lot of vision research and unlocked the demands for the real time solutions for a number of unsolved problems in computer vision. While a commercial budget camera is an attractive choice of these vehicles, a significant distortion could be observed in the captured images. These cameras are generally built upon CMOS sensors, which possess a prevalent mechanism widely known as rolling shutter (RS). In contrast to global shutter (GS) camera which capture the scene in a row-wise fashion from top to bottom with a constant inter-row delay. The RS imaging acquires apparent camera motion for different rows and violates the properties of the perspective camera model. This causes noticeable and prominent distortions.

DETAILED DESCRIPTION

Figure 1A:
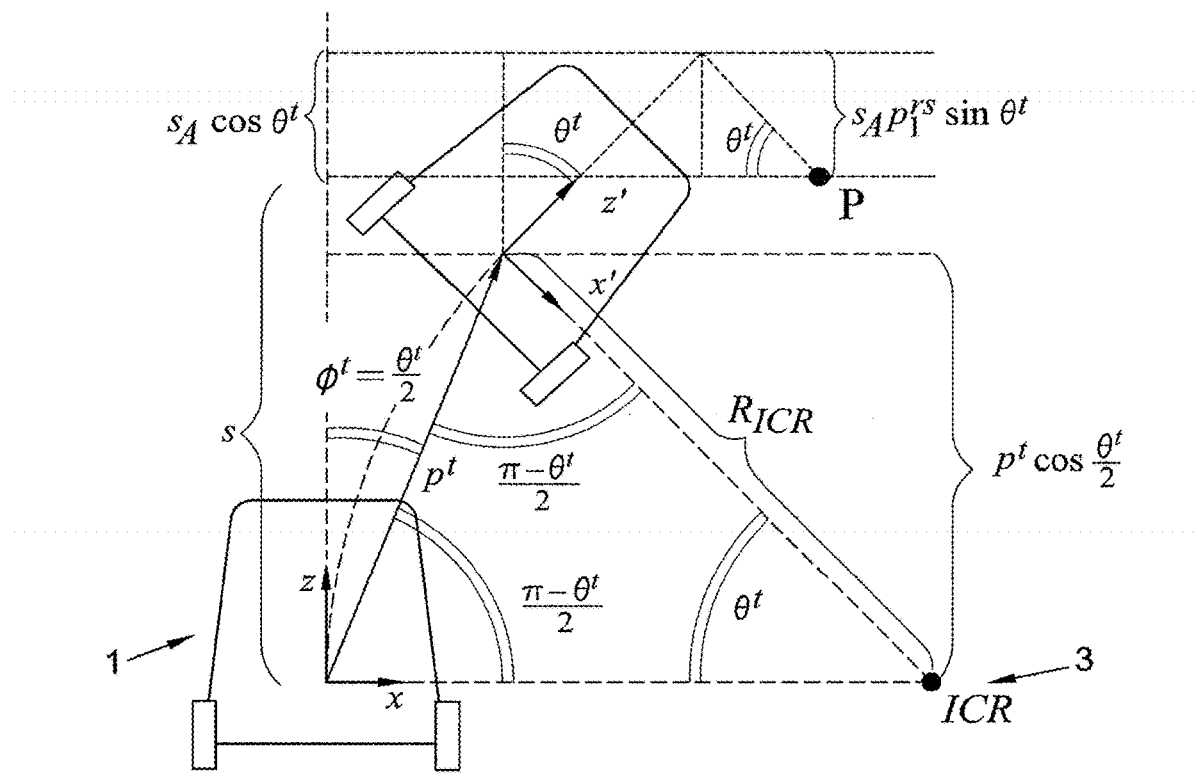
FIG. 1(a) is a schematic of a vehicle undergoing rotation used to describe Ackermann motion.

In an embodiment, a method of compensating for camera motion during capture of an image in a rolling shutter camera is provided, the method comprising:

receiving an image of a scene captured by a camera with a rolling shutter;

extracting line segments in said image;

estimating the movement of the camera during the capturing of the image from the received image; and producing an image compensated for the movement during capture of the image, wherein the scene is approximated by a horizontal plane and two vertical planes that intersect at a line at infinity and estimating the movement of the camera during the capture of the image comprises assuming that the extracted line segments are vertical and lie on the vertical planes.

The above method extracts line segments. In an image, line segments can correspond to the sides of buildings etc. The above method also provides a simplified model of the scene and then fits these line segments to the model. By fitting the line segments to the simplified model, line segments that correspond to other features can be disregarded. In an embodiment, four line segments are fitted.

In an embodiment, the above method is used in an urban setting where the camera is mounted on a vehicle driving along a road where the boundaries of the road, e.g. buildings etc are modeled by the two vertical planes. However, the boundaries of the side of the road may be provided by the crash barriers of the side of the road.

Other settings can be used, for example, the vehicle can be an autonomous robot, such as, a vacuum cleaner etc, where the vertical planes correspond to the walls of the room being cleaned. However, the problem of motion compensation for a rolling shutter camera is more acute in situations with a camera is moving quickly.

In one embodiment, to determine whether a line segment lies on vertical planes comprises determining whether a normal to the line segment is perpendicular to the vertical direction. In a further embodiment, it is possible to determine if this condition is fulfilled by representing pixels in a received two dimensional image in three dimensions using homogeneous coordinates.

As noted above, in an embodiment, the camera is mounted on a vehicle, the motion of a 4 wheeled vehicle on a road can be modeled by so-called Ackermann motion where it is assumed that all the four wheels of a vehicle roll around a common point during a turn. In an embodiment, estimating the movement of the camera comprises:

relating the position of a pixel in an image captured using the rolling shutter camera to the position of an image which has been compensated for the motion of the camera, wherein the motion of the camera during capture of the image is modeled using Ackermann motion.

However, the method can also be used for pure rotational motion (i.e. no translational component to the motion) and pure translational motion (i.e. no rotational component to the motion).

In an embodiment, it is presumed that there is no vertical motion.

In an embodiment, it is assumed that the camera place is vertical, i.e. the camera is attached to the car vertically. In a further embodiment, the camera position may also be rotated with respect to the vertical and estimating for the movement of the camera during the capturing of the image comprises correcting for the rotation of the camera from the vertical.

The above methods will provide a solution. However, there may be errors in the solution as possibly at least one of the extracted segments may not be from a vertical sidewall. Therefore, in embodiments, the above framework provides a minimal solver for a Random sampling consensus method (RANSAC) or the like. Thus, in an embodiment, the method further comprises refining a model using a robust estimator, wherein the model parameters of the model describe the movement of the camera using image capture and depth of the scene.

For example, the robust estimator may comprise:
setting the model parameters as the best model parameters of a best model;
evaluating the fit of the best model;
extracting further line segments from said image and calculating new model parameters to produce a new model;
evaluating the fit of the new model;
updating the best model parameters with the new model parameters if the fit of the new model is better than the fit of the best model; and
continually repeating the process of selecting further line segments to produce a new model, evaluating the fit of the new model and updating the best model parameters with the new model parameters if the fit of the new model is better than the fit of the best model until a stopping criteria is reached.

The fit may be evaluated by calculating the number of inliers.

It should be noted that the above methods can estimate the movement of the camera during the capturing of the image using only image data from a single received image.

Various methods may be employed to accelerate the estimation of the motion of the camera. For example, three of the extracted segments may be fitted to just one of said vertical planes to obtain an estimate of the camera motion parameters and a parameter related to the depth of the scene; and then a further parameter related to the depth of the scene is estimated by substituting the already estimated parameters to the constraint of the other line segment.

The scene depth for a 3D point P in the scene of which the image is captured is the forward distance of the 3D point P from the camera. The scene depth of point P corresponding to a pixel in an image captured by a rolling shutter camera will depend on the motion of the camera. However, in some embodiments, the inverse scene depth in an image captured by the rolling shutter camera and the inverse scene depth in an image which has been compensated for the motion of the camera is assumed to be linear.

In further embodiments, to avoid processing incorrect solutions, the extracted segments may be with at least one threshold to determine prior to determining whether said line segments lies on at least one of the said two vertical planes. For example, the length of the line segments may be compared with a threshold and lines shorter than the threshold are discarded.

In a further embodiment, the cross product of two of the extracted line segments in homogenous coordinates for the rolling shutter captured image (without correction) is calculated. The magnitude of the dot product of this calculated vector with the vertical is then compared with a threshold and the lines are discarded if the threshold is exceeded. This pre-filtering of line segments using the algebraic error $|(u_i^{rs} \times v_i^{rs})^T e_y| > 0.5$ increases the efficiency of RANSAC significantly, since it removes clear outliers. The above algebraic expression determines if a line segment is vertical.

In a further embodiment, during the robust processing described above, among the solutions, only the potential ones are considered by discarding unrealistic solutions (e.g., solutions corresponding to the absolute translation velocity above 200 km/h and absolute angular velocity over 90 deg/s).

In a further embodiment, a system for compensating for camera motion during capture of an image by a rolling shutter camera is provided, the system comprising:
a processor, said processor comprising:
an input for receiving an image of a scene captured by a camera with a rolling shutter; and
an output for outputting image data compensated for the movement of the camera during capture of the image,
wherein the processor is adapted to:
extract line segments from the received image
estimate the movement of the camera during the capturing of the image from the received image; and
produce image data compensated for the movement of the camera during capture of the image
wherein the scene is approximated by a horizontal plane and two vertical planes that intersect at a line at infinity and estimating the movement of the camera during the capture of the image comprises assuming that the extracted line segments are vertical and lie on the vertical planes.

The above may allow for an image to be output such that it is displayed. Alternatively, the image can be output for further processing, for example, determining features from the image for object recognition. In one further embodiment, the compensated image is used as an input to an autonomous driving system. The RS compensated image can then be used to determine the location of the vehicle with respect to a road and/or for collision avoidance.

The inverse of the scene depth and the car velocity introduces a gauge freedom. Thus, it is possible to estimate the location of the car w.r.t. the vertical planes if the translation velocity is known. Also, the translation velocity can be estimated if the location of the car with respect to the wall is known.

Since some methods in accordance with embodiments can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

The above provides A method of estimating camera motion from a single image captured by a rolling shutter image sensor using detected vertical line segments in the image and using the Ackermann motion principle, a method of computing a coarse depth map from a single rolling-shutter image and a method of compensating rolling shutter distortion from a single rolling shutter image.

Figure 1B:
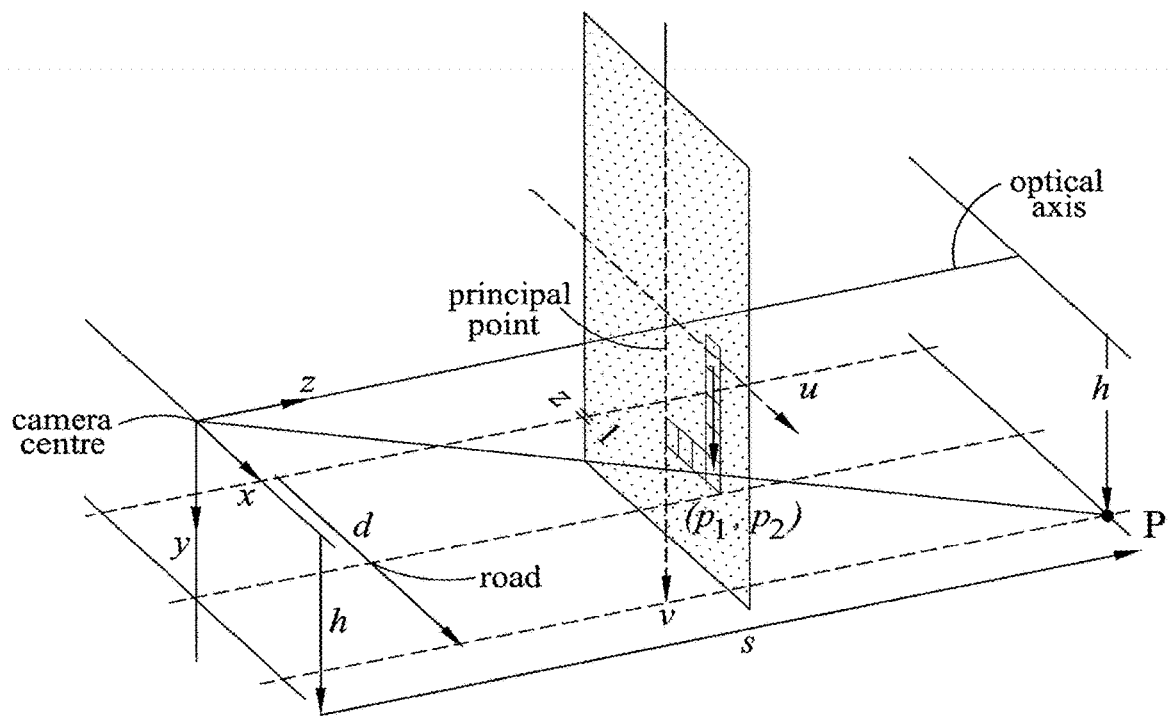
FIG. 1(b) is a schematic of a vehicle undergoing translation used to describe Ackermann motion.

FIG. 1(a) and FIG. 1(b) are figures showing models used for explaining the motion of a vehicle 1 which is provided with a camera (not shown). FIG. 1(a) demonstrates pure circular motion and FIG. 1(b) pure translational motion which also shows the relation between the scene depth and the pixel coordinates.

Global shutter and rolling shutter cameras differ in how the image sensors are exposed while capturing the photographs. In the former case, the light strikes at all the rows of the image sensor simultaneously for a constant duration of time. For a rolling shutter camera, each row is exposed for a regular interval of time, while the camera undergoes a (small) motion.

In FIG. 1(a), the rotational motion of the vehicle 1 will be considered. In FIG. 1(a), let $P \in \mathbb{R}^3$ be a 3D point in space w.r.t. the GS camera coordinates. Then the position of the point P w.r.t. RS camera coordinates is $$P_A = R_A^t(P - T_A^t) \tag{1}$$

which can be written in the normalized pixel coordinates as follows $$s_A^{rs} K^{-1} p^{rs} = R_A^t(sK^{-1}P - T_A^t), \tag{2}$$

where $p = [p_1, p_2, 1]^T$ and $p^{rs} = [p_1^{rs}, p_2^{rs}, 1]^T$ are the homogeneous pixel coordinates of the pixel $(p_1, p_2)$ of the GS and RS cameras respectively. s and $s_A^{rs}$ are corresponding scene depths. K is the intrinsic camera matrix. $R_A^t$ and $T_A^t$ are the rotation and translation of the vehicle 1 at time $t = \tau p_2^{rs}$ where $\tau$ is the time delay between two successive rows. A is the Ackermann motion parameters. For readability, in the rest of this analysis, p and $p^{rs}$ are considered on the image plane, i.e., pre-multiplied by $K^{-1}$. Thus (2) becomes $$sp = s_A^{rs} R_A^t p^{rs} + T_A^t. \tag{3}$$

where $(R_A^t)^T$ is the transpose of $(R_A^t)$. It should be noted that the scene depth $s_A^{rs}$ varies with the pixels and also with the camera motion.

The Ackermann steering principle assumes that all the four wheels of a vehicle roll around a common point during a turn. This principle holds for any automotive vehicle which ensures all of the wheels exhibit a rolling motion. This common point is known as the Instantaneous Center of rotation (ICR) 3 and is computed by intersecting all the roll axis of the wheels. The ICR 3 is shown in FIG. 1(a). In FIG. 1(a), the radius of the circular motion goes to infinity under a pure forward motion.

The vehicle is assumed to undertake a fixed translational and angular velocity while capturing the image. If the vehicle 1 performs pure circular motion with a rotation angle $\theta^t$, then, the vehicle must satisfy the circular motion constraints $$\varphi^t = \frac{\theta^t}{2} \varphi$$

as shown in FIG. 1(a). It should be noted that here the x-axis is taken along the radius towards the ICR. The relative pose between the vehicles (previous and current position) can be written as $$R_A^t = \begin{bmatrix} \cos\theta^t & 0 & -\sin\theta_t \\ 0 & 1 & 0 \\ \sin\theta^t & 0 & \cos\theta^t \end{bmatrix}, T_A^t = \begin{bmatrix} \rho^t \sin\frac{\theta^t}{2} \\ 0 \\ \rho^t \cos\frac{\theta^t}{2} \end{bmatrix} \tag{4}$$

where $\theta^t$ is the relative yaw angle and $\rho^t$ is the displacement of the vehicle at time t. Substituting in (3), the scene depth is obtained by $$s = s_A^{rs}(\cos\theta^t - p_1^{rs}\sin\theta^t) + \rho^t \cos\frac{\theta^t}{2} \tag{5}$$

which can also be verified by FIG. 1(a). If it is assumed that the vehicle undergoes a circular motion with an angular velocity $\alpha$ and a translational velocity $\beta$. Under the assumption, $$R_A^t = \begin{bmatrix} 1 - 2\alpha^2 t^2 & 0 & -2\alpha t \gamma_t \\ 0 & 1 & 0 \\ 2\alpha t \gamma_t & 0 & 1 - 2\alpha^2 t^2 \end{bmatrix}, T_A^t = \beta t \begin{bmatrix} \alpha t \\ 0 \\ \gamma_t \end{bmatrix}, \tag{6}$$

$$\alpha^2 t^2 + \gamma_t^2 = 1$$

where $A = \{\alpha, \beta\}$ is the set of unknown rolling shutter parameters. The scene depth $s^{rs}$ A is simplified into $$s_A^{rs} = \frac{s - \beta t}{1 - 2 p_1^{rs} \alpha t}.$$

It should be noted that the terms involving the motion parameters A of third and higher orders are ignored. Under small rotations, the rotation matrix can be linearly approximated. Therefore, further dropping the second order terms from (6) (eventually, $\gamma_t$ becomes 1) and substituting in (3)

$$sp = \frac{s - \beta t}{1 - 2 p_1^{rs} \alpha t}(I_3 + 2|r_A^t|_\times) p^{rs} + \beta t s_A^t \tag{7}$$

where $[\bullet]_\times$ denotes the skew-symmetric cross-product matrix and $I_3$ is the 3×3 identity matrix. $r_A^t = [0, \alpha t, 0]^T$ and $s_A^t = [\alpha t, 0, 1]^T$ are the angular rotation and the contribution of the circular motion to the translation.

It can be assumed that the vertical direction is known, which is readily available from an external hardware source, e.g., inertial measurement unit (MU). The accelerometers and gyroscopes of the IMUs provide a precise measure of the orientation of the gravitational acceleration (roll and pitch angles) in the camera frame, from which the vertical direction $e_y$ can be derived. Without loss of generality, it can be assumed further that the known vertical direction of the camera is also vertical w.r.t. the scene coordinates, i.e. $e_y = [0, 1, 0]$.

Let $u_i = [u_{i1} \ u_{i2} \ u_{i3}]^T$ and $v_i = [v_{i1} \ v_{i2} \ v_{i3}]^T$ be the motion compensated end points of a line segment $l_i$. Then, the normal of the interpretation plane of $l_i$ is $u_i \times v_i$. If the li is vertical, then the interpretation plane must pass through the vertical axis, which leads to $(u_i \times v_i)^T e_y = 0$, i.e.

$$u_{i3} v_{i1} - u_{i1} v_{i3} = 0 \tag{8}$$

Substituting in terms of rolling shutter pixel coordinates, the above equation (8) leads to a polynomial equation with unknown motion parameters A and unknown scene depth s. In this embodiment, the rolling shutter compensation requires an estimation of the scene depth s at every individual pixel. In the following section, a simplified parametric representation of the scene depth s is employed, which is approximately valid for vehicles driving in urban areas.

Figure 2A:
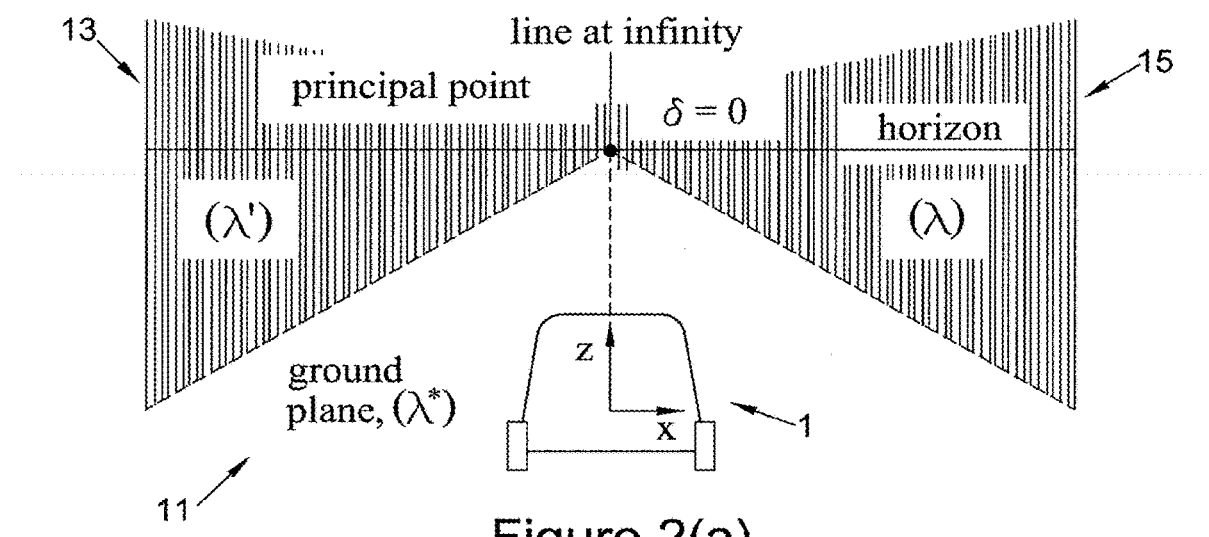
FIG. 2(a) is a schematic showing a vehicle and the approximation the scene observed by a camera on the vehicle.
Figure 2B:
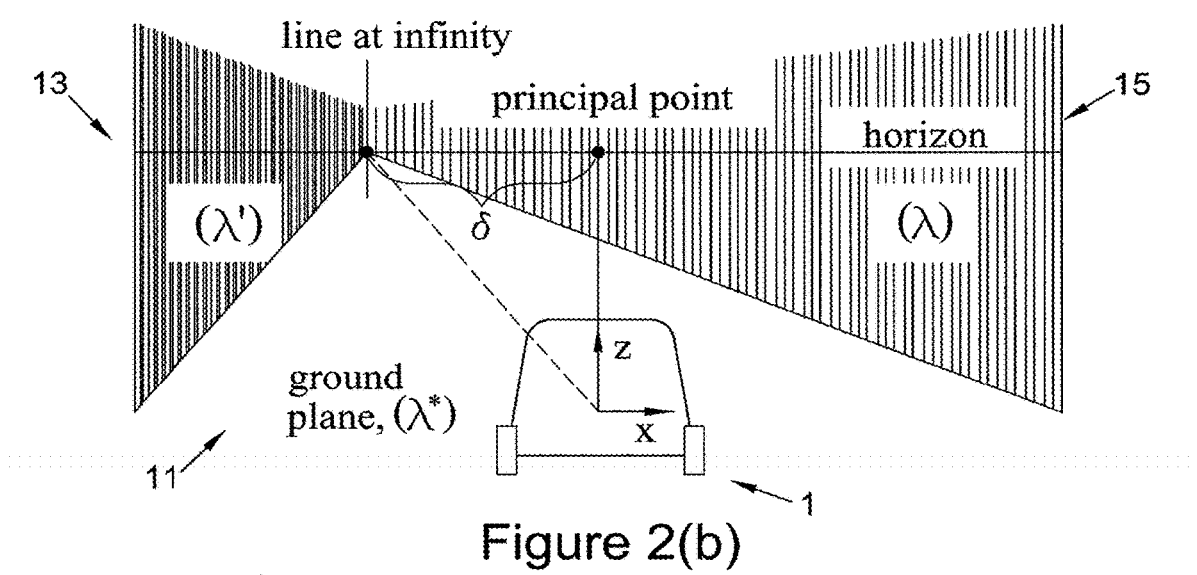
FIG. 2(b) is a is a schematic showing a vehicle and the approximation the scene observed by a camera on the vehicle where the scene is not symmetric.

FIGS. 2(a) and 2(b) will be used to explain how the depth is parameterised in an embodiment. The scene is assumed to be composed of two vertical planes 13, 15 (buildings, etc.) and one horizontal plane (road) 11. FIGS. 2(a) and (b) show that the two sides of the roads 11 are approximated by two vertical planes which intersect at the line at infinity. The road 11 is considered as the horizontal ground plane. Then the horizon must pass through the principal point of the camera as the camera is assumed to be vertical. The scene depth at any pixel is considered as the minimum depth of the scene surrounded by the planes.

The inverse of the scene depth is assumed to be zero for the column corresponding to the line at infinity and then increases linearly along the sides of the road.

Let $(p_1, p_2)$ be the normalized pixel coordinates of a 3D point $P \in \mathbb{R}^3$ on the ground plane at a depth s. By the pinhole camera model $$\frac{p_2}{1} = \frac{h}{s}, \text{ i.e,}$$

$s^{-1} = h^{-1} p_2$ as shown in FIG. 1(b) where h is the height of the camera from the ground plane.

Similarly, for the points on any of the vertical planes, $s^{-1} = d^{-1} p_1$ where d is the distance of the vehicle from the vertical plane. In general, for the vehicles facing the vertical planes sideways as shown in FIG. 2(b) $s^{-1} = d^{-1}(p_1 - \delta)$ where $\delta$ is the column corresponds to line at infinity. Thus, the inverse of the scene depth $s^{-1}$ is linear in column number of the pixel in normalized image coordinates.

Thus, in this embodiment, it can be assumed that $s^{-1} = \max\{\lambda'(p-\delta), \lambda(p-\delta), \lambda_* p\}$ is the inverse depth at the pixel $(p_1, p_2)$. The column $\delta$ corresponds to the line at infinity. $\delta'$, $\delta$ are the inverse of the distances of the camera from the vertical planes. $\delta_*$ is the inverse of the height of the camera which is assumed to be known. By this construction, the vertical line segments must lie on any of the vertical planes in 3D represented by $\delta'$, $\delta$. Thus, equation (7) becomes $$p = \frac{(1-\beta t s^{-1})}{(1-2p_1^{rs}\alpha t)}(I_3 + 2[r_A^t]_\times)p^{rs} + \beta t s^{-1} s_A^t \quad (9)$$

$$s^{-1} = \lambda'[p_1 - \delta]_- + \lambda[p_1 - \delta]_+$$

where $[x]_- = -\min\{0, x\}$ and $[x]_+ = \max\{0, x\}$ are non-zeros only on the respective vertical planes. The scale of the depth parameter $\lambda'$, $\lambda$ and the scale of the translational velocity $\beta$ introduce a gauge freedom. Thus, knowing one parameter, the other two can be estimated explicitly.

In this work, the gauge is fixed by choosing $\lambda' = 1$, i.e., it is assumed that the position of the vehicle w.r.t. one of the vertical plane is known, and the translational velocity $\beta$ of the vehicle and the parameter $\lambda$ of the other side of the vertical plane are estimated. On the other hand, if the velocity of the vehicle $\beta$ is known, estimation of the parameters of the vertical planes $\lambda'$ and $\lambda$, leads to the same solver. Further, if the detected vertical line segments touch the ground plane whose pixel coordinates are known, then the velocity of the vehicle as well as the location can be computed from $\lambda_*$. Nevertheless, the distorted image can always be compensated without knowing the scale (velocity, depth etc.).

To solve two motion parameters $\{\alpha, \beta\}$ and two depth parameter $\{\lambda, \delta\}$, four line segments are required to estimate the model as well as the depth of the scene. Notice that in above, $s^{-1} = [p_1 - \lambda]_- + \lambda [p_1 - \delta]_+$ is computed w.r.t. GS camera coordinates. Substituting equation (9) into equation (8) leads to a system of eight polynomial equations of degree five with 29 monomials. The Gröbner basis solution for this system involves eliminating a 467×478 matrix, which takes ≈ 0.1 second for each problem instance.

The efficiency is improved with the following approximations. The inverse of depth $s^{-1}$ is assumed to be linear w.r.t. RS pixel coordinates, i.e. $s^{-1} = [p_1^{rs} - \delta]_- + \lambda[p_1^{rs} - \delta]_+$. The experiments demonstrate that even with such approximation, the parameters can still be very accurately estimated.

In an embodiment, the problem is further simplified by considering three line segments in one of the vertical planes which are solved by Gröbner basis method. It computes $\alpha$, $\beta$ and $\delta$. These are then substituted in the constraint of equation (8) of the other line segment—forms a quadratic equation in $\lambda$ of which the least absolute solution is chosen. The Gröbner basis method generates an elimination template matrix of size 12×15 on which a G-J elimination method is performed. This produces 3 solutions and takes ≈ 0.001 s for each problem instance. Among the solutions, only the potential ones are considered by discarding unrealistic solutions (e.g., solutions corresponding to the absolute translation velocity above 200 km/h and absolute angular velocity over 90 deg/s).

A more general case will now be considered where the camera is installed with a known angle given by an orthogonal matrix $R_\omega \in SO(3)$. Then the pixel coordinate of a 3D point $P \in \mathbb{R}^3$ in equation (1) w.r.t. the GS and RS camera coordinates become $s'R_\omega p = P$ and $s'_A R_\omega p^{rs} = P_A$ where s' and $s'_A$ proportional to the scene depth. Thus, (1) becomes $$s'_A R_\omega p^{rs} = R_A^t (P - T_A^t). \quad (10)$$

The above could also be written in terms of GS coordinate frame as follows $$s'R_\omega p = s'_A(I_3 + 2[r_A^t]_\times)R_\omega p^{rs} + s_A^t. \quad (11)$$

where $r_A^t = [0, \alpha t, 0]^T$ and $s_A^t = [\alpha t, 0, 1]^T$ are the angular rotation and the contribution of the circular motion to the translation. $(I_3 + 2[r_A^t]_\times)R_\omega$ could also be observed as the linearization of the rotation matrix along $R_\omega$. Note that $s' = s/(R_\omega^3 p)$ and $s'_A = s_A^{rs}/(R_\omega^3 p^{rs})$ where s is the scene depth corresponding to the pixel p and $R_\omega^3$ is the third row of $R_\omega$. Substituting, $$p^{rs'} = \frac{1}{R_\omega^{3T} p} R_\omega p^{rs} \text{ and } p' = \frac{1}{R_\omega^{3T} p} R_\omega p$$

along with $s_A^{rs} = (s-\beta t)/(1-2p_1^{rs'}\alpha t)$ in above, the following equations are obtained:

$$p' = \frac{(1-\beta t s'^{-1})}{(1-2p_1^{rs'}\alpha t)}(I_3 + 2[r_A^t]_\times)p^{rs'} + \beta t s'^{-1} s_A^t \quad (12)$$

$$s'^{-1} = \lambda'[p'_1 - \delta]_- + \lambda[p'_1 - \delta]_+$$

Note that t could be replaced by $p_2^{rs}$. In this scenario, the rotated line segments in p' coordinates are vertical. Substituting above in equation (8), a set of equations of degree five are obtained and are then solved by the Gröbner basis method. This then generates an elimination template matrix of size 37×43 on which a G-J elimination method is performed. This produces 6 solutions for each problem instance.

Next, the scenario for which the vehicle undergoes pure translation motion, $\alpha=0$ will be considered. Thus, for the left side of the plane, equation (9) becomes $$p = \frac{(1-\beta p_2^{rs}(p_1-\delta))}{(1-2p_1^{rs}\alpha t)}p^{rs} + \beta p_2^{rs}(p_1-\delta)s_A^t \quad (13)$$

where $s_A^t=[0, 0, 1]^T$. In this scenario, a 3-line algorithm will be sufficient to have a finite solution—two of the line segments lie on one plane and the other line segment on the other plane. Thus, $p_1-\delta$ can be directly computed in terms of GS pixel coordinates as follows $$p_1=p_1^{rs}(1+\beta\delta p_2^{rs})/(1+\beta p_1^{rs}p_2^{rs}) \quad (14)$$

i.e., $p_1-\delta=(p_1^{rs}-\delta)/(1+\beta p_1^{rs}p_2^{rs}) \quad (15)$

Substituting the pixels in terms of rolling shutter pixel coordinates in equation (8) and then simplifying the equations, it is possible to obtain:

$$(v_{i1}^{rs}u_{i1}^{rs}u_{i2}^{rs}-u_{i1}^{rs}v_{i1}^{rs}v_{i2}^{rs})\beta-(u_{i1}^{rs}u_{i2}^{rs}-v_{i1}^{rs}v_{i2}^{rs})$$
$$\beta\delta=u_{i1}^{rs}-v_{i2}^{rs} \quad (16)$$

Note that $u_{i3}^{rs}=1$ and $v_{i3}^{rs}=1$ were substituted during the simplification. Two such constraints in equation (16) for two line segments leads to a unique solution. Thus, three line segments are sufficient to have a finite solution for both of the vertical planes—two of the line segments lie on one plane from which we uniquely compute $\beta$ and $\delta$.

The substitution of the estimated parameters to the other constraint, corresponding to the other line segment, leads to a linear constraint in $\lambda$ which again has a unique solution. Since this closed form solution is obtained without an elimination template, it leads to an extremely fast solver.

Next, the scenario for which the vehicle undergoes pure translation motion, $\beta=0$ will be considered. The change of depth $s_A^{rs}$ will not affect the vertical direction in equation (8). In this scenario, the geometric relation between the GS and RS image frames becomes $$p \propto (I_3+[r_A^t]_x)p^{rs} \quad (17)$$

where $r_A^t=[0, \alpha t, 0]^T$. After simplification, the constraint (8) is simplified to $$(u_{i1}^{rs}u_{i2}^{rs}v_{i2}^{rs}-v_{i1}^{rs}v_{i2}^{rs}u_{i2}^{rs})\alpha^2-(u_{i1}^{rs}v_{i1}^{rs}v_{i2}^{rs}-v_{i1}^{rs}u_{i1}^{rs}u_{i2}^{rs}+u_{i2}^{rs}-v_{i2}^{rs})\alpha+u_{i1}^{rs}-v_{i1}^{rs}=0 \quad (18)$$

which is a quadratic in $\alpha$ and only the solution with the least absolute value is considered. Thus, a single line segment is sufficient to estimate $\alpha$, this leads to an efficient and a much faster 1-line algorithm.

However, the above scenario is not an Ackermann motion (also different from motion demonstrated in FIG. 1(a)).

To illustrate the above, experiments were conducted on synthetic and real datasets to verify the effectiveness of the proposed minimal solver. Synthetic experiments were aimed to analyze the efficiency and stability of the solver. In particular, the degenerate cases where the camera undergoes a pure translation or rotational velocity. The solvers used were as follows:

4-LA: The full 4-line solver for Ackermann motion [Gröbner basis method, Eq. (9)].
3-LA: The 3-line solver for pure translational motion [Eq. (17)].
1-LA: The 1-line solver for pure rotational motion [Eq. (18)].

The proposed solvers were evaluated in conjunction with the RANSAC schedule. In all of the experiments, the inlier threshold is chosen to be 0.5 pixel and the number of iterations is chosen at a confidence level 0.99.

The ability to determine s also allows for a coarse depth map of the scene to be produced.

Figure 3:
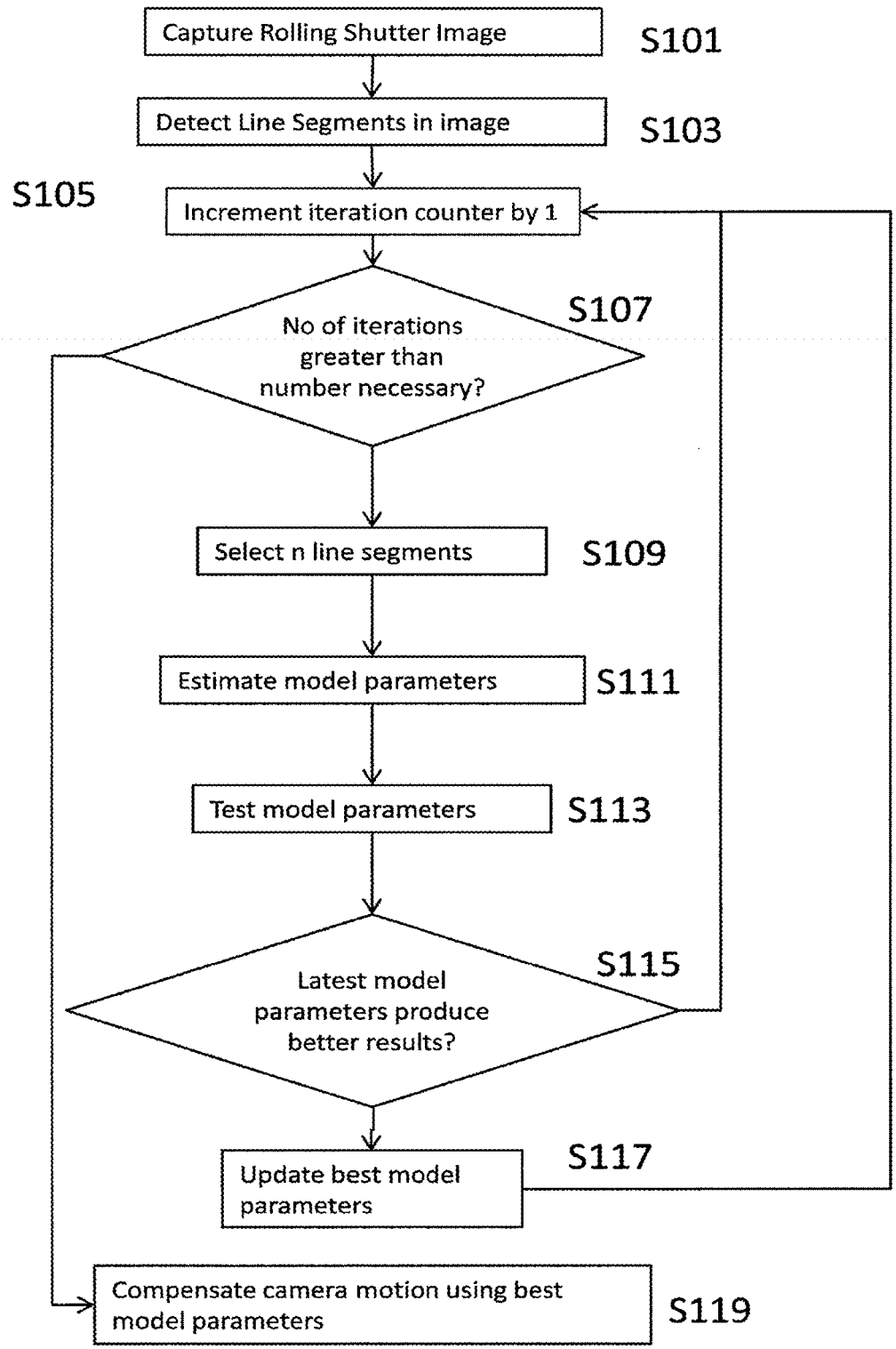
FIG. 3 is a flow diagram showing a method in accordance with an embodiment.

FIG. 3 is a flow chart showing how the minimal solvers can be evaluated using RANSAC.

In step S101, a rolling shutter image is captured. The remainder of the analysis discussed in relation to this flow diagram will consent the data from just this single image.

In step S103, line segments in the image are detected. In an embodiment, a line segment detector lsd is used, a suitable lsd is described for example in: von Gioi R Grompone, Jeremie Jakubowicz, Jean-Michel Morel, and Gregory Randall. LSD: a fast line segment detector with a false detection control. IEEE TPAMI, 32(4):722-732, 2010.

Although it is not shown here, various tests can then be made of the line segments to see if they are suitable for further processing. In an embodiment, line segments of size less than 35 pixels are discarded.

The line segments are pre-filtered with the algebraic error $|(u_i^{rs}\times v_i^{rs})^T e_y|>0.5$. This increases the efficiency of RANSAC significantly, since it removes clear outliers.

Next, the iteration counter is incremented by one. On the first pass through the system, this will set the counter to 1. This counter will then be used to determine when enough samples have been evaluated against a stopping criteria. In general, RANSAC will complete a fixed number of loops. There are many possible methods for determining this number and they mainly based on the criteria that selecting further samples would not provide further refinement of the model parameters.

Next, it is determined in step S107 if the counter has reached its end value. The end value will be set to satisfy the above explained stopping criteria.

Figure 4:
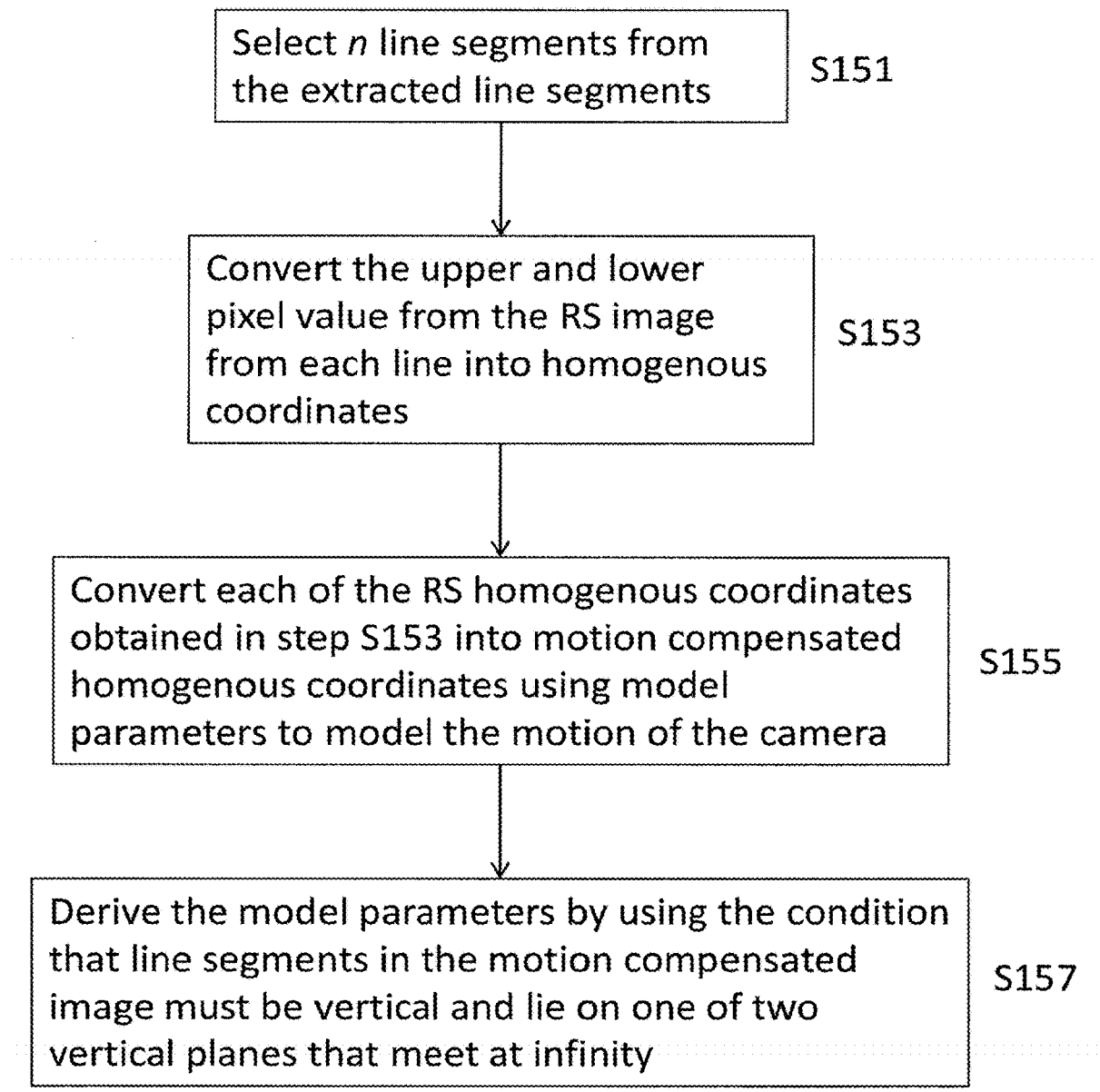
FIG. 4 is a flow diagram showing in more detail the steps of deriving the model parameters in the method of FIG. 3.
Figure 5A:
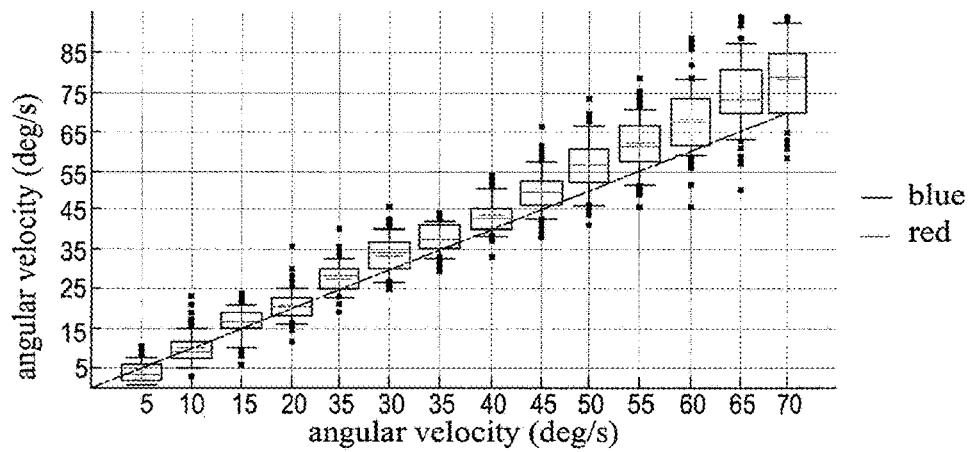
FIG. 5(a) is a plot of the measured angular velocity against the actual angular velocity for a vehicle exhibiting just angular velocity.
Figure 5B:
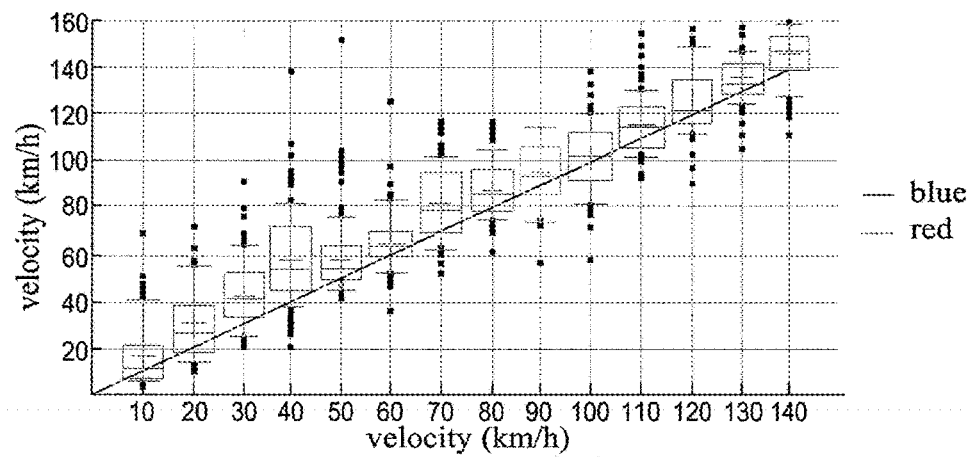
FIG. 5(b) is a plot of the measured translational velocity against the actual translational velocity for a vehicle exhibiting just translational velocity.
Figure 5C:
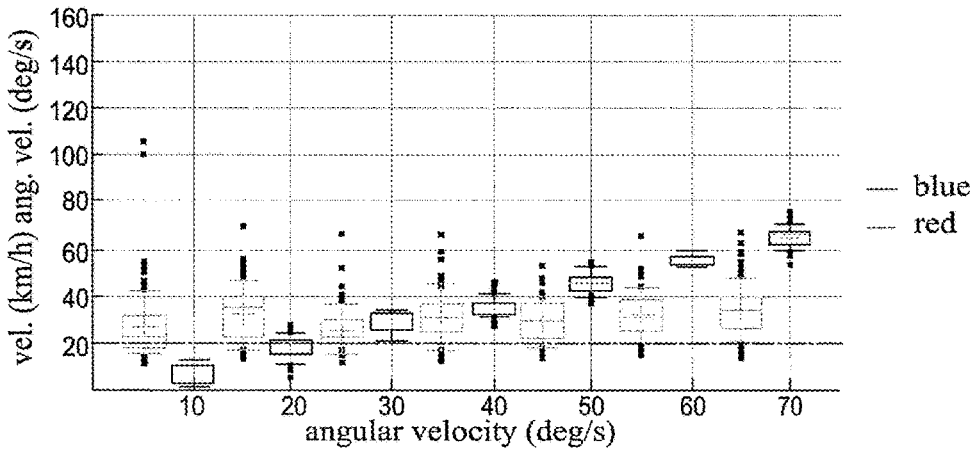
FIG. 5(c) is a plot of the measured angular velocity and translational velocity against the actual angular velocity for a vehicle with a translational velocity of 20 km/h.
Figure 5D:
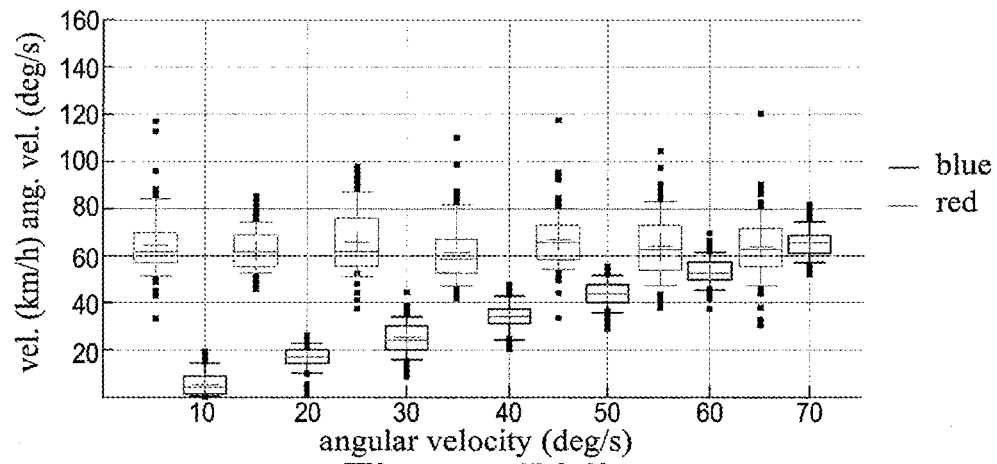
FIG. 5(d) is a plot of the measured angular velocity and translational velocity against the actual angular velocity for a vehicle with a translational velocity of 60 km/h.
Figure 5E:
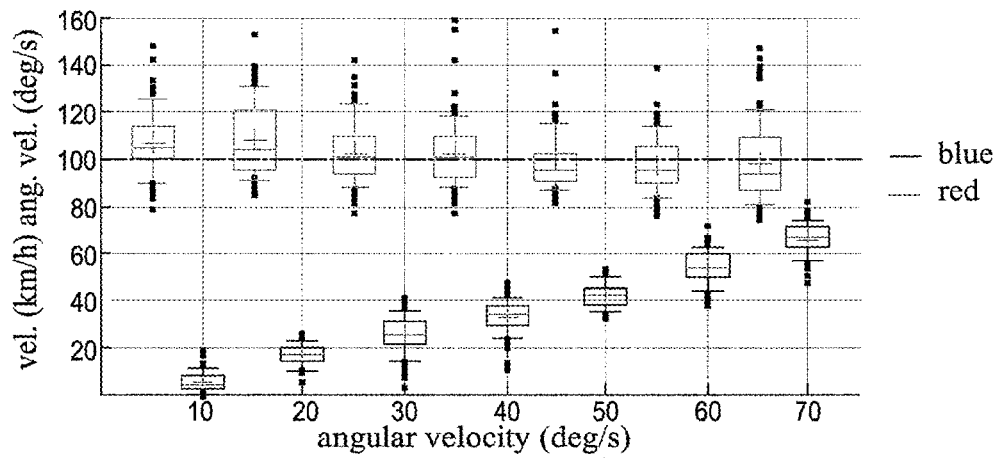
FIG. 5(e) is a plot of the measured angular velocity and translational velocity against the actual angular velocity for a vehicle with a translational velocity of 100 km/h.
Figure 5F:
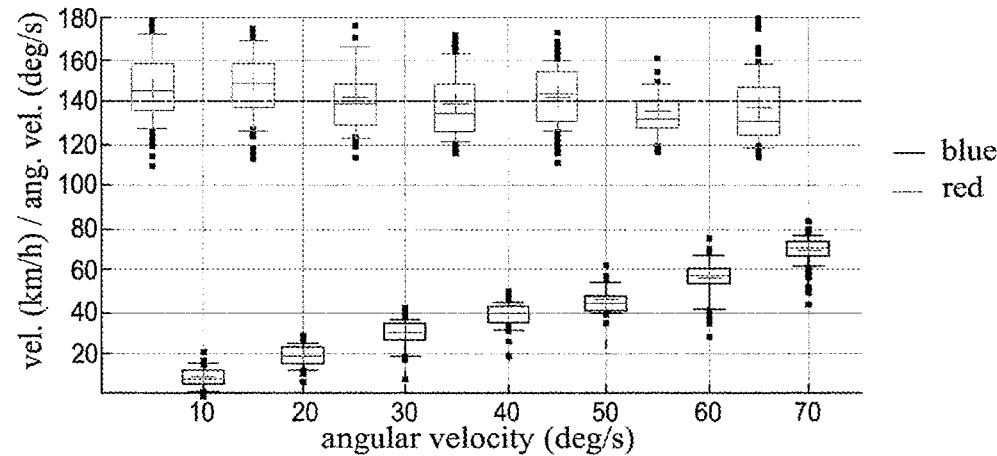
FIG. 5(f) is a plot of the measured angular velocity and translational velocity against the actual angular velocity for a vehicle with a translational velocity of 140 km/h.

Next, in step S109, the RANSAC process starts. First, n line segment are randomly selected. Next, in step S111, the model parameters are estimated. The above explanation in relation to FIGS. 1 and 2 has explained in detail how the model parameters are estimated. However, FIG. 4 is a flowchart showing an overview of the general process of steps S109 and S111.

In step S151, n line segments are selected from the extracted line segments. The number of line segments that are selected depends on the number of model parameters that are to be solved. The vehicle is moving with possibly both translational and rotational motion, then 4 lines need to be selected. If it is already known that the vehicle is only exhibiting pure translational motion, then only 3 lines need to be selected since it is only necessary to solve 3 parameters. Finally, if it is known that the vehicle is only exhibiting pure rotational motion, then there is only one unknown and therefore only one line needs to be selected.

In step S153, the upper and lower pixel values from each line segment are extracted from the RS image and converted into homogeneous coordinates. This is achieved by assuming that the Z coordinate is 1.

In step S155, the RS homogeneous coordinates are converted to motion compensated homogeneous coordinates according to equation (9) above. It should be noted that this involves expressing the motion compensated coordinates in terms of the RS coordinates and unknown model parameters.

In step S157, the motion compensated homogenous coordinates are then inserted into the condition described in equation (8) which is one way of expressing the requirement that the motion compensated lines must lie on the vertical planes which are used to model the scene. Equation (8) provides this condition by requiring that a horizontal line must be produced by the cross product of the upper and lower coordinates the motion compensated line. This must be true if these coordinates lie on a vertical plane which extends to infinity. It is determined whether the produced line is horizontal by calculating its dot product with the known vertical.

Returning now to the flowchart of FIG. 3, in step S113, the model parameters are tested. This is done by calculating the motion compensated homogeneous coordinates for each of the other extracted line segments in the dataset and determining whether these segments are inliers or outliers by seeing if they satisfy the criteria explained with relation to step S157 of FIG. 4.

It is determined in step S115 whether or not the latest iteration provides a better answer (i.e. produces more inliers). If it does, then these model parameters are saved as the best model parameters and the loop restarts by incrementing the counter at step S105.

Once the stopping criteria has been reached, the best model parameters are used to compensate the camera motion and obtain an undistorted image by the following forward mapping procedure of the RS pixels into the global frame (3)

$$p = \frac{(1 - \beta p_2^{rs} s^{-1})}{(1 - 2p_1^{rs} \alpha t)}(I_3 + 2[r_A^t]_\times) p^{rs} + \beta p_2^{rs} s^{-1} s_A^t \quad (19)$$

$$s^{-1} = \max([p_1^{rs} - \delta]_- + \lambda[p_1^{rs} - \delta]_+, p_2^{rs} \lambda^*)$$

where $r_A^t = [0, \alpha p_2^{rs}, 0]^T$ and $s_A^t = [\alpha p_2^{rs}, 0, 1]^T$. Note that $\lambda^*$ is the inverse of the height of the camera from the ground plane which is assumed to be known. Note that the boundaries of the ground plane and the vertical planes are the pixels for which $p_1^{rs} - \delta = p_2^{rs} \lambda^*, p_2^{rs} > 0$ or $\lambda(p_1^{rs} - \delta) = p_2^{rs} \lambda^*$, $p_2^{rs} > 0$. After the forward map, the unknown pixels are linearly interpolated. Pixels located outside of the compensated frame are placed with intensity 0.

The above process explained with reference to FIGS. 3 and 4 can be visualised through the following pseudo-code:

---
Algorithm 1:
---
1: procedure COMPENSATEMOTION( Input image )
2:    detectLineSegments(LSD)
3:    pruneLineSegments
4:    estimateMotion( α; β )andDepth( δ ; λ )byAlgorithm 2 (below)
5:    warpCompensatedImage
6:    return The motion compensated image
7: end procedure ---
Algorithm 2:
---
1: procedure RANSACACKERMANN(Line Segments)
2:    while count ≠ maxIterations do
3:      ($u_{rs}$ ; $v_{rs}$ ) ← get4random(LineSegments)
4:      ($u_{rs}$ ; $v_{rs}$ ) ← get3leftmost($u_{rs}$ ; $v_{rs}$ )
5:      (α; β; δ ) ← estimateGröbnerBasis($u_{rs}$ ; $v_{rs}$ )
6:      λ ← solveQuadraticrightmostLineSegment
      /* Substituting (α; β; δ ) in equation (8) */
7:      if outofrange (α; β; δ,λ ) then
8:        continue
9:      end if
10:     countInliers(α; β; δ, λ)
11:     updateBestfoundsofar (α; β; δ, λ )
12:     count ← count + 1
13:    end while
14:    return Bestfoundsofar(α; β; δ, λ )
15: end procedure A clean GS image was selected for the experiment where the camera is placed at 1.2 m height from the ground plane and 2.5 m from the vertical plane on the left side of the road. RS images were synthesised with 30 frames/s (40% readout time) by simulating the Ackermann motion randomly at a discreet interval of the translational velocity 10-140 km/h and the angular velocity 10-70 deg/s. A random noise was further added with std 2 km/h and 2 deg/s while simulating the motion.

The proposed minimal solvers 1-LA, 3-LA and 4-LA in conjunction with RANSAC are executed on each of the instances of the synthetic RS image.

The statistics of the estimated motions are plotted in FIG. 5. Here evaluation of the proposed methods 1-LA (FIG. 5(a)), 3-LA (FIG. 5(b)) and 4-LA (FIG. 5(c) for a translational velocity of 20 km/h, FIG. 5(d) for a translational velocity of 60 km/h, FIG. 5(e) for a translational velocity of 100 km/h and FIG. 5(f) for a translational velocity of 140 km/h) are shown taken from synthetic data. The dotted lines represent the simulated velocity. Along x-axis and y-axis, the simulated and predicted motion is displayed. The estimated translational and the angular velocities are represented by red and blue boxes respectively, where the 75% of estimated values lie within the box. 0+0 and 0−0 are the mean and the median of the estimated motions. It can be observed that the motions are estimated accurately for the translational velocities 40-80 km/h and for angular velocities 50-140 deg/s, moreover, the joint estimations of the velocities are as accurate as individual estimations. Moreover, in almost all the cases, proposed minimal solvers produce visually aesthetic images.

Figure 6A:
FIG. 6(a) is a synthetic rolling shutter image.
Figure 6B:
FIG. 6(b) is the motion compensated image of FIG. 6(a)

FIG. 6, displays the result of one of the random instances from FIG. 5 where the vehicle undergoes an Ackermann motion with angular velocity 40 deg/s, translational velocity 60 km/h. The estimated angular velocity is 53.49 deg/s and the translational velocity is 62.16 km/h. FIG. 6(a) is a synthetic rolling shutter image and FIG. 6(b) Motion compensated image The proposed method is implemented in Matlab and the runtimes are computed on an i7 2.8 GHz CPU utilizing only a single core. On average it takes around 0.087 second to rectify a 360×520 image, excluding LS detection and the rectification, which is two-three orders of magnitude faster over the most recent methods.

See Table 1 for the detailed comparison.

TABLE 1

Runtime comparison of different methods in seconds.

| | Methods | | |
|---|---|---|---|
| | 1-LA | 3-LA | 4-LA |
| Runtime | 0.001 s | 0.003 s | 0.087 |

The above methods provide a minimal solver for rolling shutter camera motion compensation under an Ackermann motion from a single view. A 4-line algorithm is developed to estimate the simplified depth of the scene along with the motion parameters. The above method is also the first of its kind to exploit the minimal solvers for monocular rolling shutter motion compensation which allows to have an extremely fast compensation method. The results demonstrate the computational efficiency and the effectiveness of the proposed approach.

The above describes a minimal solver for RS compensation from a single distorted image which incorporates the translational part of the ego-motion. The above method provides a fast minimal solver for rolling shutter motion compensation. The above method uses an algorithm which tailored for the Ackermann motion with the constraint of a known vertical direction. This is a common scenario for automotive vehicles. In conjunction with RANSAC, the proposed solver is executed in real time.

Modern automotive vehicles are often equipped with a budget commercial rolling shutter camera. These devices often produce distorted images due to the inter-row delay of the camera while capturing the image.

Figure 7:
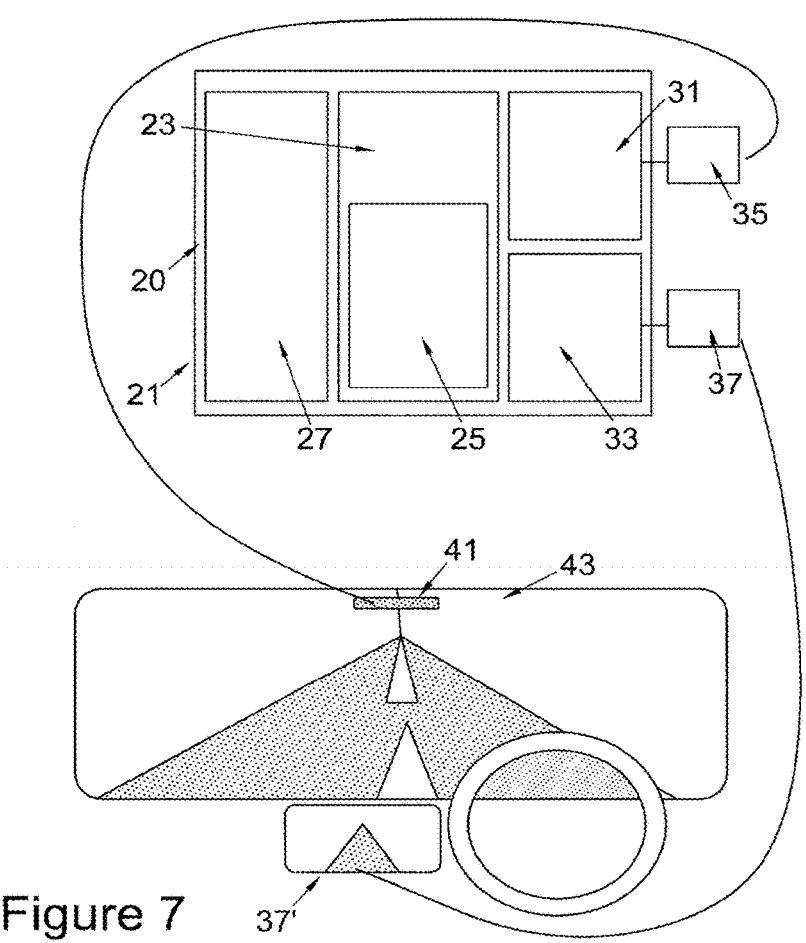
FIG. 7 is a schematic of an apparatus in accordance with an embodiment.

FIG. 7 shows a possible basic architecture of a system 20 adapted to a vehicle with a rolling shutter camera. The system 20 comprises a processor 23 which executes a program 25. The system 20 further comprises storage 27. The storage 27 stores data which is used by program 25 to analyse the data received from a camera.

The analysis unit 20 further comprises an input module 31 and an output module 33. The input module 31 is connected to a camera input 35. Camera input 35 receives camera data from the camera which is a rolling shutter camera 41 located on vehicle screen 43. The camera input 35 may simply receive data directly from the camera 41 or alternatively, camera input 35 may receive camera data from an external storage medium or a network where a rolling shutter camera is located.

In an embodiment, connected to the output module 33 is a display 37. The display may be provided as display 37' on the vehicle dashboard. The display 37 may be used for displaying motion compensated images generated from the camera data received by the camera input 35. Instead of a display 37, the output module 33 may output to a file or over the internet etc.

The system of FIG. 7 may be provided with other controls. For example, the system of FIG. 7 may be able to take the compensated image data and identify objects in the scene captured by the camera. This in turn, could be used for autonomous driving and other applications.

The above method would allow (or progress the research towards) the automotive industry to incorporate affordable rolling shutter camera for autonomous vehicles as it allows estimation of the location of the vehicles with respect to the side-walls if the translational velocity is given.

In the above methods both translational and rotational motion can be modeled using data from a single frame. Translation motion cannot be disregarded in the Ackermann motion. In the above methods Ackermann motion is estimated under a known vertical direction. The above methods also estimate an approximate scene depth while estimating the motion parameters. In the above a minimal solver is developed by utilizing vertical line segments to compensate the rolling shutter camera motion and the proposed method is tailored for the Ackermann motion principle which is the common scenario for automotive vehicles.

In the above methods a minimal solver is proposed for the rolling shutter motion compensation which assumes known vertical direction of the camera. Thanks to the Ackermann motion model of vehicles which consists of only two motion parameters, and two parameters for the simplified depth assumption that lead to a 4-line algorithm. The proposed minimal solver, in conjunction with RANSAC used in some embodiments, estimates the rolling shutter camera motion efficiently, accurately and also demonstrates that the system can operate in real time.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of methods and systems described herein may be made without departing from the spirit of the inventions. The accompanying claims and their equivalents are intended to cover such forms of modifications as would fall within the scope and spirit of the inventions.

The invention claimed is:

1. A method of compensating for camera motion during capture of an image in a rolling shutter camera, the method comprising:
    receiving an image of a scene captured by a camera with a rolling shutter;
    extracting line segments in said image;
    estimating movement of the camera during the capturing of the image from the received image; and
    producing an image compensated for the movement during the capture of the image,
    wherein the scene is approximated by a horizontal plane and two vertical planes that intersect at a line at infinity and estimating the movement of the camera during the capture of the image comprises assuming that the extracted line segments are vertical and lie on the vertical planes.

2. A method according to claim 1, wherein determining whether a line segment lies on the vertical planes comprises determining whether a normal to the line segment is perpendicular to a vertical direction.

3. A method according to claim 1, wherein estimating the movement of the camera comprises representing pixels in a received two dimensional image in three dimensions using homogeneous coordinates.

4. A method according to claim 1, wherein estimating the movement of the camera comprises assuming a linear relationship between an inverse scene depth in the image captured by the rolling shutter camera and the inverse scene depth in the image which has been compensated for the motion of the camera, the scene depth for a 3D point P in the scene being a forward distance of the 3D point P from the camera.

5. A method according to claim 1, wherein estimating the movement of the camera comprises:
    relating a position of a pixel in the image captured using the rolling shutter camera to a position of the image which has been compensated for the motion of the camera,
    wherein the motion of the camera during capture of the image is modeled using Ackermann motion.

6. A method according to claim 1, wherein estimating the movement of the camera comprises:
    relating a position of a pixel in the image captured using the rolling shutter camera to a position of an the image which has been compensated for the motion of the camera,
    wherein the motion of the camera during capture of the image is modeled using purely rotational motion.

7. A method according to claim 1, wherein estimating the movement of the camera comprises:
    relating a position of a pixel in the image captured using the rolling shutter camera to a position of the image which has been compensated for the motion of the camera,
    wherein the motion of the camera during capture of the image is modeled using purely translational motion.

8. A method according to claim 1, wherein a vertical position of the camera is determined via a sensor in addition to the camera that captures the image.

9. A method according to claim 1, wherein a camera position is rotated with respect to vertical and estimating for the movement of the camera during the capturing of the image comprises correcting for rotation of the camera from the vertical.

10. A method according to claim 1, further comprising refining a model using a robust estimator, wherein model parameters of the model describe the movement of the camera using image capture and depth of the scene.

11. A method according to claim 10, wherein using the robust estimator comprises:
    setting the model parameters as best model parameters of a best model;
    evaluating a fit of the best model;
    extracting further line segments from said image and calculating new model parameters to produce a new model;
    evaluating a fit of the new model;
    updating the best model parameters with the new model parameters if the fit of the new model is better than the fit of the best model; and
    continually repeating the process of selecting further line segments to produce a new model, evaluating the fit of the new model and updating the best model parameters with the new model parameters if the fit of the new model is better than the fit of the best model until a stopping criteria is reached.

12. A method according to claim 11, wherein the fit is evaluated by calculating a number of inliers.

13. A method according to claim 1, the movement of the camera during the capturing of the image is estimated using only image data from a single received image.

14. A method according to claim 5, wherein estimating the movement of the camera during the capture of the image comprises:
    fitting three of the extracted segments to one of said vertical planes to obtain an estimate of camera motion parameters and a parameter related to a depth of the scene;
    determining a further parameter related to the depth of the scene by assuming the normal of a further line segment extracted from the image when expressed in motion compensated coordinates is normal to a vertical of the scene.

15. A method according to claim 1, the method further comprising comparing the extracted segments with at least one threshold to determine prior to determining whether said line segments lies on at least one of the said two vertical planes.

16. A system for compensating for camera motion during capture of an image in a rolling shutter camera, the system comprising:
    a processor, said processor comprising:
        an input for receiving an image of a scene captured by a camera with a rolling shutter; and
        an output for outputting image data compensated for movement of the camera during the capture of the image,
        wherein the processor is adapted to:
        extract line segments from the received image
        estimate the movement of the camera during the capturing of the image from the received image; and
        produce image data compensated for the movement of the camera during the capture of the image
    wherein the scene is approximated by a horizontal plane and two vertical planes that intersect at a line at infinity and estimating the movement of the camera during the capture of the image comprises assuming that the extracted line segments are vertical and lie on vertical planes.

17. A system according to claim 16, wherein said camera is mounted on a vehicle.

18. An autonomous driving system provided on a vehicle, said system comprising an image input from the system of claim 16.

19. An autonomous driving system according to claim 18, adapted to recognise objects from image data that has been compensated for motion of the vehicle during the capture of the image.

20. A carrier medium comprising computer readable code configured to cause a computer to perform the method of claim 1.

* * * * *